US012626834B2

(12) United States Patent
Ren et al.

(10) Patent No.: US 12,626,834 B2
(45) Date of Patent: May 12, 2026

(54) CONDUCTIVE PASTE AND ELECTRONIC DEVICE

(71) Applicant: BEIJING DREAM INK TECHNOLOGIES CO., LTD., Beijing (CN)

(72) Inventors: Zhongwei Ren, Beijing (CN); Jiameng Kang, Beijing (CN)

(73) Assignee: BEIJING DREAM INK TECHNOLOGIES CO., LTD., Beijing (CN)

( * ) Notice: Subject to any disclaimer, the term of this patent is extended or adjusted under 35 U.S.C. 154(b) by 219 days.

(21) Appl. No.: 17/995,576

(22) PCT Filed: Nov. 23, 2021

(86) PCT No.: PCT/CN2021/132435
§ 371 (c)(1),
(2) Date: Oct. 5, 2022

(87) PCT Pub. No.: WO2022/199083
PCT Pub. Date: Sep. 29, 2022

(65) Prior Publication Data
US 2024/0312666 A1 Sep. 19, 2024

(30) Foreign Application Priority Data
Mar. 24, 2021 (CN) ......................... 202110311458.9

(51) Int. Cl.
*H01B 1/22* (2006.01)

(52) U.S. Cl.
CPC ...................................... *H01B 1/22* (2013.01)

(58) Field of Classification Search
CPC ........................................................ H01B 1/22
(Continued)

(56) References Cited

U.S. PATENT DOCUMENTS 5,180,523 A * 1/1993 Durand .................... H01B 1/22
252/514
5,951,918 A * 9/1999 Kuwajima ............... H01B 1/02
252/514
2017/0274453 A1* 9/2017 Okada ................. C09D 127/06

FOREIGN PATENT DOCUMENTS

CN 104830247 A * 8/2015
CN 105793931 A 7/2016
(Continued)

OTHER PUBLICATIONS

Of Li Baojun et.al. [CN110176325A] (machine translation) (Original provided in the IDS) (Year: 2019).*
(Continued)

*Primary Examiner* — Sally A Merkling
*Assistant Examiner* — Nazmun Nahar Shams
(74) *Attorney, Agent, or Firm* — McCoy Russell LLP

(57) ABSTRACT

The present application provides a conductive paste and an electronic device and relates to a technical field of new material. The conductive paste provided by the present application includes, 5%-20% by weight of a resin, 5%-20% by weight of a solvent, and 70%-90% by weight of a conductive filler; the conductive filler includes a first conductive filler, a second conductive filler, and a third conductive filler, and the first conductive filler is configured to increase a filling amount of the conductive filler, the second conductive filler is configured to reduce a sintering temperature of the conductive filler, and the third conductive filler is configured to slow erosion to the conductive filler by a soldering tin during a soldering process. By adopting the technical solution of the present application, soldering can be performed directly with soldering tin wire.

4 Claims, 3 Drawing Sheets

(58) Field of Classification Search
USPC .......................................................... 148/24
See application file for complete search history.

(56) References Cited

FOREIGN PATENT DOCUMENTS

| | | | |
|---|---|---|---|
| CN | 108264879 | A | 7/2018 |
| CN | 108410388 | A | 8/2018 |
| CN | 108565041 | A | 9/2018 |
| CN | 109390075 | A | 2/2019 |
| CN | 110176325 | A | 7/2019 |
| CN | 110211724 | A | 9/2019 |
| CN | 113066600 | A | 7/2021 |
| JP | 2004362950 | A | 12/2004 |
| JP | 2013194169 | A | 9/2013 |
| JP | 2014216089 | A | 11/2014 |
| JP | 2016131070 | A | 7/2016 |
| KR | 101814084 | B1 | 1/2018 |

OTHER PUBLICATIONS

Lin Baoping et.al. [CN110211724A] (machine translation) (Year: 2019).*

Matsubara Toyoji, et.al. [JP2016131070A] (machine translation) (Year: 2016).*

Wang ChungGuang, et.al. [CN104830247A] (machine translation) (Year: 2015).*

ISA China National Intellectual Property Administration, International Search Report Issued in Application No. PCT/CN2021/132435, Feb. 25, 2022, WIPO, 2 pages.

State Intellectual Property Office, Office Action and Search Report Issued in Application No. 202110311458.9, May 6, 2022, 11 pages. (Submitted with Partial Translation).

State Intellectual Property Office of the People's Republic of China, Notice of Allowance Issued in Application No. 202110311458.9, Feb. 6, 2023, 6 pages. (Submitted with Partial Translation).

* cited by examiner

CONDUCTIVE PASTE AND ELECTRONIC DEVICE

CROSS REFERENCE TO RELATED APPLICATIONS

The present application is a U.S. National Phase of International Application No. PCT/CN2021/132435, entitled "CONDUCTIVE PASTE AND ELECTRONIC DEVICE," and filed on Nov. 23, 2021. International Application No. PCT/CN2021/132435 claims priority to Chinese Patent application No. 202110311458.9 filed on Mar. 24, 2021. The entire contents of each of the above-listed applications are hereby incorporated by reference for all purposes.

TECHNICAL FIELD

The present application relates to the field of new material, in particular to a conductive paste and an electronic device.

BACKGROUND

A copper layer on top layer of a conventional printed circuit board is susceptible to oxidation, thereby inhibiting the wetting effect of the soldering tin paste, which prevents the copper layer from creating reliable solder joints and increases a detachment risk of electrical component assembly. While the disadvantage of a copper layer being susceptible to oxidation may be overcome by electroplating or chemical-plating methods in which the nickel or gold layer is plated to improve the soldering reliability, the process is complicated and the environment may be contaminated.

In prior art, there are also technical solutions for fabricating printed circuit boards with low temperature cured conductive paste instead of copper, however, low temperature cured conductive pastes in prior art also fail to achieve direct soldering of soldering tin wire, therefore, it is desirable to develop a conductive paste that can be soldered directly with soldering tin wire.

SUMMARY

The present application provides a conductive paste and an electronic device, which can be directly soldered by soldering tin wire.

In a first aspect, the present application provides a conductive paste, which adopts following technical solutions:

A conductive paste, comprises 5%-20% by weight percentage of a resin, 5%-20% by weight percentage of a solvent, and 70%-90% by weight percentage of a conductive filler; wherein the conductive filler comprises a first conductive filler, a second conductive filler, and a third conductive filler, wherein the first conductive filler is configured to increase a filling amount of the conductive filler, the second conductive filler is configured to reduce a sintering temperature of the conductive filler, and the third conductive filler is configured to slow corrosion to the conductive filler by solder during soldering.

Optionally, a filling upper limit of the first conductive filler is higher than 90%.

Optionally, the second conductive filler has a sintering temperature below 150° C.

Optionally, a velocity v1 of alloying the first conductive filler with tin, a velocity v2 of alloying the second conductive filler with tin, and a velocity v3 of alloying the third conductive filler with tin satisfy: $v3<v1$, $v3<v2$.

Optionally, the first conductive filler is flake silver powder, the second conductive filler is spherical silver powder, and the third conductive filler is flake silver coating copper powder.

Optionally, a specific surface area of the flake silver powder is equal to or smaller than 0.35 m2/g, a particle size of the spherical silver powder is equal to or smaller than 600 nm, the flake silver coating copper powder has a single crystal structure, and a thickness-to-diameter ratio is greater than 1:10.

Optionally, a weight percentage of the flake silver powder is higher than 50% and a weight percentage of the flake silver coating copper powder is higher than 10%.

Optionally, the resin is one or more of a polyester resin, an epoxy resin and an acrylic resin.

In a second aspect, the present application provides an electronic device, comprising a substrate and a conductive wiring on the substrate, wherein the conductive wiring is made of the conductive paste according to any one of the above items.

Optionally, the electronic device further comprises an electronic component soldered to the conductive wiring by a soldering tin layer.

A conductive paste and an electronic device are provided. In the conductive paste, the conductive filler includes a first conductive filler, a second conductive filler and a third conductive filler, and the first conductive filler can be used to increase the filling amount of the conductive filler, such that the conductive paste has better electrical properties; the second conductive filler can be used to reduce a sintering temperature of the conductive filler, making the conductive paste easier to be soldered and sintered; the third conductive filler can be used to slow corrosion to the conductive filler by the soldering tin during the soldering process, such that the conductive wiring can be soldered directly through the soldering tin wire without significantly affecting the performance of the conductive wiring.

BRIEF DESCRIPTION OF DRAWINGS

In order to more clearly explain some embodiments of the present application or the technical solution in the related art, the drawings used in the description of the embodiments or the related art will be briefly described below. The drawings in the following description are some embodiments of the present application. Those skilled in the art may obtain other drawings based on these drawings.

DETAILED DESCRIPTION OF EMBODIMENTS

Figure 1:
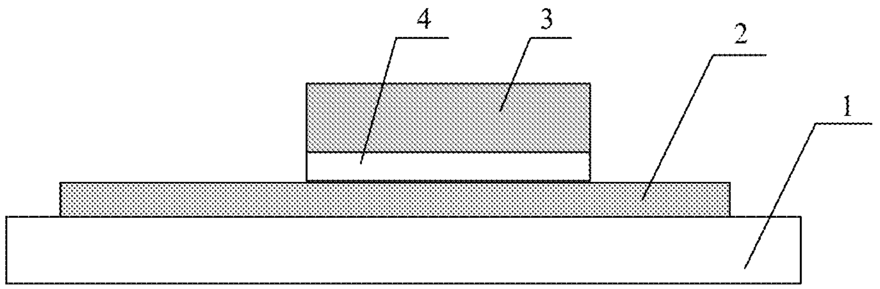
FIG. 1 is a schematic structural view of an electronic device provided by an embodiment of the application.

In order to more clearly illustrate objects, technical solutions and advantages of embodiments of the present application, the technical solutions in some embodiments of the present application are clearly and completely described below with reference to the accompanying drawings in some embodiments of the present application. The described embodiments are merely part of the embodiments of the present application rather than all of the embodiments. All other embodiments obtained by those skilled in the art shall fall into the scope of the present application.

It should be noted that various technical features in embodiments of the present application can be combined with one another if there is no conflict.

An Embodiment of the present application provide a conductive paste comprising 5%-20% by weight of a resin, 5%-20% by weight of a solvent, and 70%-90% by weight of a conductive filler; the conductive filler comprises a first conductive filler, a second conductive filler, and a third conductive filler, and the first conductive filler is configured to increase a filling amount of the conductive filler, the second conductive filler is configured to reduce a sintering temperature of the conductive filler, and the third conductive filler is configured to slow corrosion to the conductive filler by a soldering tin during a soldering process.

It is noted that the higher the filling amount of the conductive filler, the better the conductive properties that the conductive paste can achieve. The first conductive filler, the second conductive filler, and the third conductive filler described above are part of conductive fillers that, in addition to the functions specifically mentioned above, are necessarily capable of being conductive.

Optionally, the weight percentage of the resin in the conductive paste may be: 5%, 6%, 7%, 8%, 9%, 10%, 11%, 12%, 13%, 14%, 15%, 16%, 17%, 18%, 19%, or 20%. The weight percentage of the solvent may be 5%, 6%, 7%, 8%, 9%, 10%, 11%, 12%, 13%, 14%, 15%, 16%, 17%, 18%, 19%, or 20%. The weight percentage of the conductive filler may be 70%, 71%, 72%, 73%, 74%, 75%, 76%, 77%, 78%, 79%, 80%, 81%, 82%, 83%, 84%, 85%, 86%, 87%, 88%, 89%, or 90%.

In the conductive paste, the conductive filler includes a first conductive filler, a second conductive filler, and a third conductive filler, and the first conductive filler may be configured to increase a filling amount of the conductive filler, such that the conductive paste has better electrical properties, and the second conductive filler may be configured to reduce a sintering temperature of the conductive filler, such that the conductive paste is easy to be soldered and sintered (i.e., the second conductive filler is a low temperature sintered conductive filler), and the third conductive filler may be configured to slow the corrosion to the conductive filler by a soldering tin during a soldering process, such that the conductive wiring may be directly soldered by the soldering tin wire, and the performance of the conductive wiring will not be significantly affected in the soldering process.

The conductive paste in embodiments of the present application can be applied in a molding process such as screen printing, flexographic printing, transfer printing, extrusion dispensing, steel mesh printing, etc., and can be cured by heating after molding to obtain the conductive wiring.

Optionally, the method for preparing the conductive paste according to embodiments of the present application may comprise the following steps:

S1, preparing an organic carrier: heating and dissolving a resin and a solvent to obtain the organic carrier; during the process, an oil bath may be used to heat with stirring during the heating process, the oil bath temperature may be ranging from 70° C. to 120° C., and the stirring speed may be ranging from 300 rpm to 800 rpm;

S2, preparing a conductive paste: after the conductive filler and the organic carrier are dispersed by stirring, a three-roll rolling is performed to obtain the conductive paste; during the process, the stirring speed may be ranging from 500 rpm to 2500 rpm; after stirring the dispersion and a mixture including the conductive filler and the organic carrier may stand for a certain time, such as half an hour (enhancing the wetting effect of the organic carrier to the conductive filler and enhancing the rolling effect subsequently), and then a three-roll rolling may be performed.

Embodiments of the present application are illustrated below for the components of the conductive paste.

Resin

The resin in embodiments herein may be one or a mixture of two of the following: a polyester resin, a polyurethane resin, an epoxy resin, an acrylic resin, a phenolic resin, an alkyd resin, a silicone resin, a chlorovinegar resin, a polyimide resin.

The resin is further selected to be one or more of a polyester resin, an epoxy resin, and an acrylic resin to make the conductive wiring made of the conductive paste more resistant to soldering with the soldering tin wire.

Solvent

In embodiments of the application, the solvent is one or a mixture of two of the following: ethanol, isopropanol, n-propanol, ethylene glycol, propylene glycol, glycerol, n-butanol, ethylene glycol propyl ether, ethylene glycol butyl ether, diethylene glycol ethyl ether, diethylene glycol propyl ether, diethylene glycol butyl ether, propylene glycol propyl ether, propylene glycol butyl ether, dipropylene glycol ethyl ether, dipropylene glycol propyl ether, and dipropylene glycol propyl ether. Propylene glycol butyl ether, ethylene glycol propyl ether acetate, ethylene glycol butyl ether acetate, diethylene glycol ethyl ether acetate, diethylene glycol propyl ether acetate, diethylene glycol butyl ether acetate, propylene glycol propyl ether acetate, propylene glycol butyl ether acetate, dipropylene glycol ethyl ether acetate, dipropylene glycol propyl ether acetate, dipropylene glycol butyl ether acetate, isophorone and terpineol.

Conductive Fillers

In embodiments of the present application, parameters, such as material, shape, or particle size of the first conductive filler, the second conductive filler, and the third conductive filler may be selected within the ranges as follows in view of meeting the previously stated performance requirements that "the first conductive filler is configured to increase the filling amount of the conductive filler, the second conductive filler is configured to reduce the sintering temperature of the conductive filler, and the third conductive filler is configured to slow the erosion to the conductive filler by the soldering tin during the soldering process."

The first conductive filler, the second conductive filler, and the third conductive filler may be one or a mixture of at least two of gold, silver, copper, iron, nickel, aluminum, graphene, carbon black, graphite, silver coating copper powder, etc.

The first conductive filler, the second conductive filler, and the third conductive filler may be in the shape of one or a mixture of at least two of sheet, sphere, linear, rod, needle, dendritic, etc.

The first conductive filler, second conductive filler, and third conductive filler may have a size of 0.1 μm to 6 μm.

Optionally, in the present embodiment, a filling upper limit of the first conductive filler is higher than 90% to further increase the filling amount of the conductive filler in the conductive paste to provide better conductivity. It should be noted that the filling upper limit of the first conductive filler is defined for one property of the first conductive filler rather than to define the filling amount in the conductive paste in the present application. The filling upper limit of the first conductive filler refers to the maximum weight percentage of the first conductive filler that can be filled in the organic carrier (mixture of the resin and solvent) given that the entire material system has a certain viscosity and fluidity to meet the application of the molding process. The filling upper limit of the first conductive filler is related to its particle size, shape, specific surface area, etc. For example, the first conductive filler is flake silver powder, and the specific surface area of the flake silver powder is further selected to be below 0.35 $m^2/g$.

Optionally, in the present embodiment, the sintering temperature of the second conductive filler may be below 150° C. so as to further reduce the sintering temperature of the conductive filler in the conductive paste, increase the solderability, reduce the temperature resistance requirement of the substrate, and extend the substrate range to be selected. For example, the second conductive filler is spherical silver powder, and the particle size of the spherical silver powder is further selected to be equal to or smaller than 600 nm.

Optionally, in the present embodiment, the velocity $v_1$ of alloying the first conductive filler with tin, the velocity $v_2$ of alloying the second conductive filler with tin $v_2$, and the velocity $v_3$ of alloying the third conductive filler with tin $v_3$ satisfy: $v_3<v_1$, and $v_3<v_2$, i. e., the third conductive filler is most difficult to have an alloy reaction with tin such that the effect of the third conductive filler to slow the corrosion to the conductive filler during soldering is more significant. The tin described above is derived from soldering tin wire during soldering with soldering tin wire. For example, the third conductive filler is silver coating copper powder, and the silver coating copper powder is selected to have a single crystal structure with a thickness to diameter ratio greater than 1:10.

In one embodiment, the first conductive filler is flake silver powder, the second conductive filler is spherical silver powder, and the third conductive filler is flake silver coating copper powder. The flake silver powder has a lower specific surface area, and a higher filling upper limit, the spherical silver powder has a higher specific surface area, and is more easily sintered and soldered. The alloying reaction rate of copper and tin in the flake silver coating copper powder is less than the alloying reaction rate of silver and tin in the flake silver powder and the spherical silver powder, and the flake silver coating copper powder has a larger size, and the barrier effect on the alloying reaction is better. If the flake silver powder in the conductive paste is replaced with spherical silver powder, the filling amount of the conductive filler in the conductive paste is greatly reduced, that is, the conductive paste containing the flake silver powder still has a suitable viscosity at a certain higher filling amount, which is suitable for the molding process of screen printing, extrusion, etc., and the viscosity of the conductive paste obtained by replacing the flake silver powder in the conductive paste with spherical silver powder is too high to match the above molding process.

Further, in the present embodiment, the specific surface area of the flake silver powder is selected to be equal to or smaller than 0.35 $m^2/g$, the particle size of the spherical silver powder is selected to be equal to or smaller than 600 nm, the flake silver coating copper powder has a single crystal structure, and the thickness-to-diameter ratio is greater than 1:10. The single crystal structure of the flake silver coating copper powder has less crystal defects, the alloying reaction rate is slow, and the flake silver coating copper powder of high thickness-to-diameter ratio is more difficult to be penetrated. Thus, the barrier effect of the flake silver coating copper powder having the single crystal structure with the large thickness-to-diameter ratio on the alloying reaction is further enhanced.

Optionally, in the conductive filler of the present embodiment, the weight percentage of the flake silver powder is greater than 50%, such as 55%, 60%, 65%, 70%, 75%, 80%, 85% etc., and any value therebetween; and the weight percentage of the flake silver coating copper powder is greater than 10%, such as 15%, 20%, 25%, 30%, 35%, 40%, 45% etc., and any value therebetween.

Additives

The conductive paste in embodiments herein may further include an additive, which may be one or more of a wetting dispersant, a curing agent, a substrate wetting agent, an accelerator, a coupling agent, a leveling agent, a rheology agent, an antioxidant, or the like.

In addition, the present application further provides an electronic device, as shown in FIG. 1, comprising: a substrate 1, a conductive wiring 2 disposed on the substrate 1, and the conductive wiring 2 is made of a conductive paste as described above.

Optionally, as shown in FIG. 1, the electronic device further includes an electronic component 3 that is soldered to the conductive wiring 2 through a soldering tin layer 4. The soldering tin layer 4 is a structure formed using soldering tin wire during the soldering process. The electronic component may be a switch, a power source, a light emitting device, a sensor, a chip, etc. according to practical requirements, which are not limited in the present embodiment.

For example, the electroconductive paste is molded onto the substrate by extrusion dispensing and then placed in an air blast drying oven for heat sintering curing. The sintering temperature of the conductive paste was 120° C. to 200° C., and the sintering time was 10 min to 80 min.

The thickness of the conductive wiring may be from 10 μm to 60 μm, such as 20 μm, 30 μm, 40 μm, or 50 μm.

The substrate may be a flexible or rigid substrate, which may be one of polyethylene terephthalate (PET), polybutylene terephthalate (PBT), polyethylene naphthalate (PEN), polyimide (PI), polyamide (PA), and the like.

The embodiments of the present application are described below in terms of advantages of conductive paste in multiple specific embodiments relative to comparative embodiments.

Embodiment 1

A conductive paste comprises the following components: 6% by weight of a polyester resin, 18% by weight of diethylene glycol ether acetate, 40% by weight of a flake silver powder, 26% by weight of a spherical silver powder, and 10% by weight of a flake silver coating copper powder.

The conductive ink was printed on the PI film by screen printing and placed in a blast air oven in a 160° C. for sintering and curing to obtain conductive wirings. The conductive wirings were soldered using soldering tin wire. In particular, the above soldering method is: soldering with a soldering tip in 180° C., the soldering test being divided into a ready test to test whether the soldering tin wire can be spread out continuously on the conductive wirings, and a resistant test in which the soldering tip reciprocates 10 times back and forth on the soldering tin with each round trip of 1 second to test whether the conductive wiring will be corroded by the soldering tin.

Figure 2:
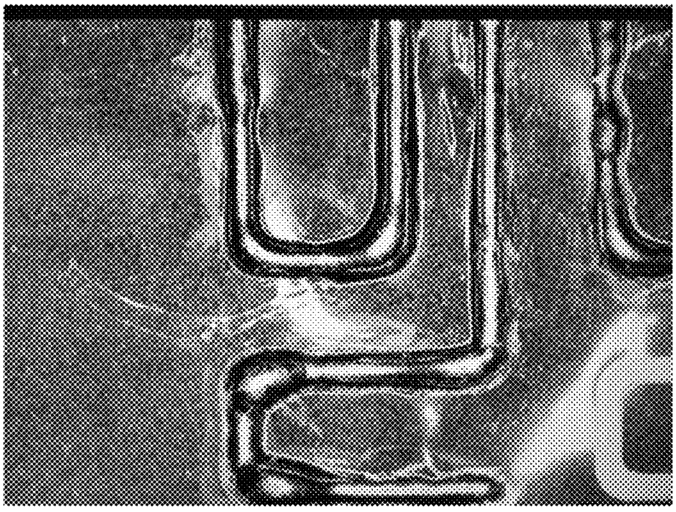
FIG. 2 is a graph showing the soldering effect of a conductive wiring provided by an embodiment of the present application.

The soldering effect of the conductive wiring in the present embodiment is shown in FIG. 2, which is good, and the conductive wirings are easy to be soldered and soldering tin resistant (the soldering tin spreads well on the surface of the conductive wiring in the soldering test, and the conductive wiring is not corroded in the soldering test).

Embodiment 2

A conductive paste comprises the following components: 5% by weight of an epoxy resin, 3% by weight of a polyester resin, 16% by weight of a diethylene glycol ether acetate, 50% by weight of a flake silver powder, 10% by weight of a spherical silver powder, and 16% by weight of a silver coating copper silver powder.

The conductive ink was printed on the PI film by screen printing and placed in a blast air oven in a 160° C. for sintering and curing to obtain conductive wirings. The conductive wirings were soldered with soldering tin wire, the soldering method was the same as above, the soldering effect was the same as that in FIG. 2, and the soldering effect was good, the conductive wirings are easy to be soldered, and soldering tin resistant.

Embodiment 3

A conductive paste comprises the following components: 7% by weight of an acrylic resin, 20% by weight of a diethylene glycol ether acetate, 55% by weight of a flake silver powder, 9% by weight of a spherical silver powder, and 9% by weight of a flake silver coating copper powder.

The conductive ink was printed on the PI film by screen printing and placed in a blast air oven in a 160° C. for sintering and curing to obtain conductive wirings. The conductive wirings were soldered with soldering tin wire, the soldering method was the same as above, the soldering effect was the same as that in FIG. 2 and the soldering effect was good, the conductive wirings are easy to be soldered, and soldering tin resistant.

Embodiment 4

A conductive paste comprises the following components: 5% by weight of an epoxy resin, 15% by weight of a diethylene glycol ether acetate, 65% by weight of a flake silver powder, 5% by weight of a spherical silver powder, and 10% by weight of a flake silver coating copper powder.

The conductive ink was printed on the PI film by screen printing and placed in a blast air oven in 160° C. for sintering and curing to obtain conductive wirings. The conductive wirings were soldered with soldering tin wire, the soldering method was the same as above, and the soldering effect was the same as shown in FIG. 2, the soldering effect was good, the conductive wirings are easy to be soldered, and soldering tin resistant.

Comparative Embodiment 1

Figure 3:
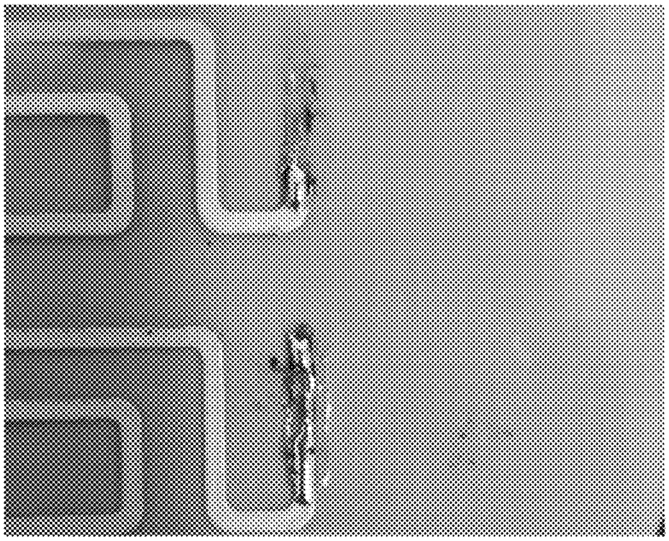
FIG. 3 is a first graph showing the soldering effect of the conductive wiring in a comparative example.

The conductive paste comprises the following components: 8% by weight of polyester resin, 20% by weight of diethylene glycol ether acetate, 60% by weight of flake silver powder, 12% by weight of silver globular. The conductive paste was printed on the PI film by screen printing and placed in a blast air oven in 160° C. for sintering and curing to obtain conductive wirings. The conductive wirings are soldered using soldering tin wire, and the soldering method is as shown in FIG. 3, the conductive wirings are easy to be soldered, but not soldering tin resistant (soldering tin spreads well on the surface of the conductive wirings during the soldering test, but the conductive wirings are corroded during the soldering test).

Comparative Embodiment 2

Figure 4:
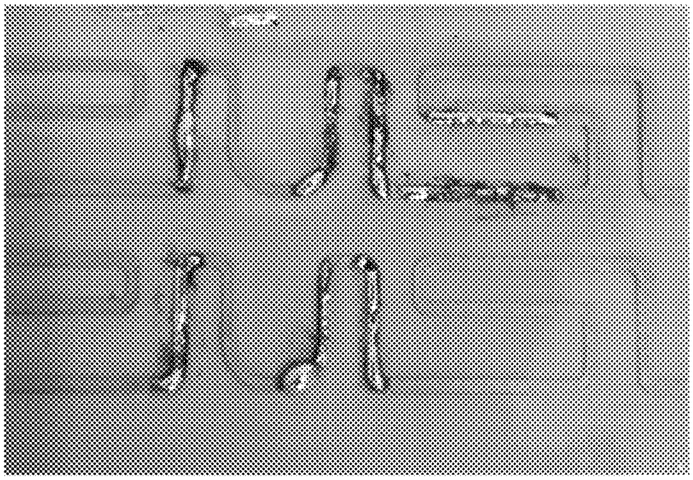
FIG. 4 is a second graph showing the soldering effect of the conductive wiring in a comparative example.

The conductive paste comprises the following components: 5% by weight of epoxy resin, 10% by weight of diethylene glycol ether acetate, 72% by weight of flake silver powder, and 13% by weight of spherical silver coating copper powder. The conductive paste was printed on the PI film by screen printing and placed in a blast air oven in 200° C. for sintering and curing to obtain a conductive wiring. The conductive wirings are soldered with soldering tin wire, the soldering method is the same as described above, and the soldering effect is shown in FIG. 4, the soldering is discontinuous, the conductive wirings are soldering tin resistant but not easy to be soldered (soldering tin is difficult to spread on the surface of the conductive wirings during the soldering test, but the conductive wirings are not corroded during the soldering test).

Comparative Embodiment 3

The conductive paste comprises the following components: 5% by weight of epoxy resin, 10% by weight of diethylene glycol ether acetate, 72% by weight of flake silver powder, and 13% by weight of flake silver coating copper. The conductive paste was printed on the PI film by screen printing and placed in a blast air oven in 200° C. for sintering and curing to obtain conductive wirings. The conductive wirings are soldered with soldering tin wire, the soldering method is the same as described above, and the soldering effect is shown in FIG. 4, the soldering is discontinuous, the conductive wirings are soldering tin resistant and not easy to be soldered (soldering tin is difficult to spread on the surface of the conductive wirings during the soldering test, but the conductive wirings are not corroded during the soldering test).

Comparative Embodiment 4

Figure 5:
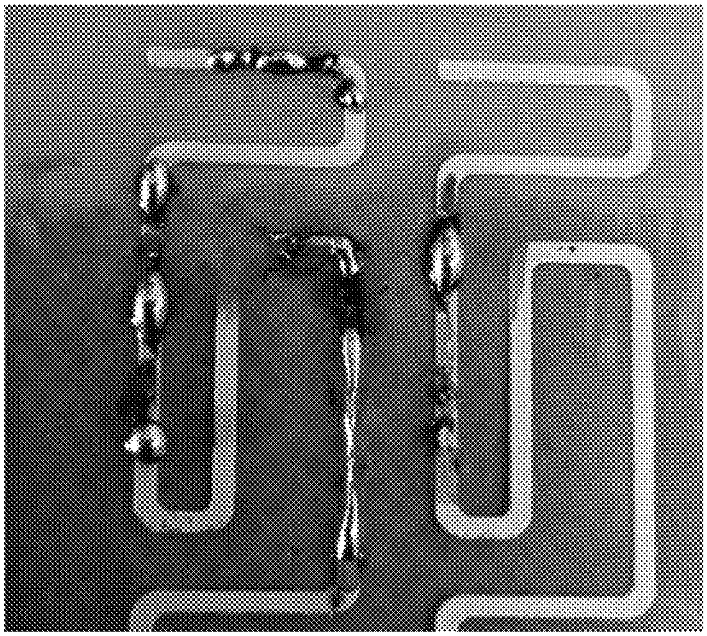
FIG. 5 is a third graph showing the soldering effect of the conductive wiring in a comparative example.

The conductive paste comprises the following components: 2% by weight of epoxy resin, 6% by weight of polyester resin, 20% by weight of diethylene glycol ether acetate, and 72% by weight of flake silver powder. The conductive paste was printed on the PI film by screen printing and placed in a blast air oven in 200° C. for sintering and curing to obtain a conductive wiring. The conductive wirings are soldered with soldering tin wire, the soldering method is the same as described above, and the soldering effect is shown in FIG. 5, the conductive wirings are not easy to be soldered and not soldering tin resistant (soldering is difficult to spread on the surface of the conductive wirings during the soldering test and the conductive wirings are corroded during the soldering test).

Comparative Embodiment 5

Figure 6:
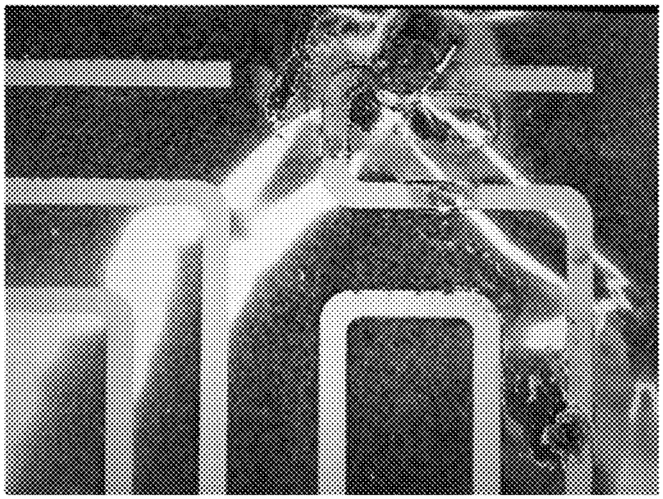
FIG. 6 is a fourth graph showing the soldering effect of conductive wiring in a comparative example.

The conductive paste comprises the following components: 2% by weight of epoxy resin, 6% by weight of polyester resin, 20% by weight of diethylene glycol ethyl ether acetate, and 72% by weight of flake silver coating copper powder. The conductive paste was printed on the PI film by screen printing and placed in a blast air oven in 200° C. for sintering and curing to obtain conductive wirings. The conductive wirings are soldered with soldering tin wire, the soldering method is the same as described above, and the soldering effect is shown in FIG. 6. The conductive wirings are not able to be soldered (soldering tin cannot spread on the surface of the conductive wiring in the soldering test).

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

The invention claimed is:

1. A conductive paste, comprising:

5%-20% by weight percentage of a resin,

5%-20% by weight percentage of a solvent, and

70%-90% by weight percentage of a conductive filler;

wherein the conductive filler comprises a first conductive filler, a second conductive filler, and a third conductive filler, wherein the first conductive filler is flake silver powder, and a specific surface area of the flake silver powder is equal to or smaller than 0.35 $m^2/g$, wherein the second conductive filler is spherical silver powder, and a particle size of the spherical silver powder is equal to or smaller than 600 nm, wherein the third conductive filler is flake silver coating copper powder, which has a single crystal structure and a thickness-to-diameter ratio greater than 1:10, and wherein a weight percentage of the flake silver powder to the spherical silver powder and the flake silver coating copper powder is 40:26:10, 50:10:16, 55:9:9, or 65:5:10.

2. The conductive paste according to claim 1, wherein the resin is one or more of a polyester resin, an epoxy resin and an acrylic resin.

3. An electronic device, comprising a substrate and a conductive wiring on the substrate, wherein the conductive wiring is made of a conductive paste of claim 1.

4. The electronic device according to claim 3, further comprising an electronic component soldered to the conductive wiring by a soldering tin layer.

* * * * *